(12) United States Patent
Mongan et al.

(10) Patent No.: US 6,304,982 B1
(45) Date of Patent: Oct. 16, 2001

(54) NETWORK DISTRIBUTED AUTOMATED TESTING SYSTEM

(75) Inventors: John Thomas Mongan, Sausalito; Dorothy Mack Cribbs, Mill Valley; John Ricardo DeAguiar, Sebastopol, all of CA (US)

(73) Assignee: AutoDesk, Inc., San Rafael, CA (US)

( * ) Notice: Subject to any disclaimer, the term of this patent is extended or adjusted under 35 U.S.C. 154(b) by 0 days.

(21) Appl. No.: 09/114,981

(22) Filed: Jul. 14, 1998

(51) Int. Cl.[7] ...................................................... H02H 3/05
(52) U.S. Cl. ................................. 714/38; 714/26; 714/45; 714/46
(58) Field of Search .................................. 714/25, 26, 31, 714/38, 46, 4, 37, 45; 709/217, 218, 219

(56) References Cited

U.S. PATENT DOCUMENTS

| | | | | |
|---|---|---|---|---|
| 5,325,530 | * | 6/1994 | Mohrmann | 395/700 |
| 5,475,843 | * | 12/1995 | Halviatti et al. | 395/700 |
| 5,561,763 | * | 10/1996 | Eto et al. | 395/183.11 |
| 5,600,789 | | 2/1997 | Parker et al. | 395/183.14 |
| 5,745,767 | * | 4/1998 | Rosen et al. | 395/704 |
| 5,748,882 | * | 5/1998 | Huang | 395/184.01 |
| 5,751,941 | * | 5/1998 | Hinds et al. | 395/183.14 |
| 5,781,720 | | 7/1998 | Parker et al. | 395/183.14 |
| 5,841,975 | * | 11/1998 | Layne et al. | 395/200.33 |
| 5,905,856 | * | 5/1999 | Ottensooser | 395/183.14 |
| 6,002,871 | * | 12/1999 | Duggan et al. | 395/704 |
| 6,012,152 | * | 1/2000 | Donik et al. | 714/26 |
| 6,026,499 | * | 2/2000 | Shirakihara et al. | 714/11 |

OTHER PUBLICATIONS

Oshana, R., "Software Testing with Statistical Usage Based Models," Embedded Systems Programming, Jan. 1997. (8 pages).

\* cited by examiner

*Primary Examiner*—Norman M. Wright (57) ABSTRACT

A server computer acts as a central repository for tests performed by any number of connected client computers, as well the results of these tests returned by the client computers. A test manager executed by the server computer analyzes the results of the tests performed by the client computers, and determines which tests have passed or failed during execution, whether the tests failed because of an application or other error, and which tests should be re-executed by the same or different client computer. A test grouper analyzes the error messages produced by the application being tested, so that tests that reveal the same defect can be grouped together. A test reducer is iteratively applied to selected tests to reduce the test to the smallest subset of the original test that still reveals the defect. In this manner, the present invention maximizes the testing efficiency of the resources used and minimizes the amount of time required of the operator to confirm failures.

60 Claims, 6 Drawing Sheets

NETWORK DISTRIBUTED AUTOMATED TESTING SYSTEM

CROSS-REFERENCE TO RELATED APPLICATIONS

This application is related to the following co-pending and commonly-assigned patent applications:

application Ser. No. 09/115,168, entitled "AUTOMATED TEST GENERATOR," filed on same date herewith, by John T. Mongan; and application Ser. No. 09/114,828, entitled "COMPLETE, RANDOMLY ORDERED TRAVERSAL OF CYCLIC DIRECTED GRAPHS," filed on same date herewith, by John T. Mongan and Dorothy M. Cribbs;

both of which applications are incorporated by reference herein.

BACKGROUND OF THE INVENTION

1. Field of the Invention

The present invention generally relates to a system for testing computer programs, and, in particular, to a network distributed automated testing system.

2. Description of the Related Art

As application programs become more complex, there is a need for automated systems to test the application programs before they are released to end users. One technique is to develop one or more test scripts that automate the testing process, wherein the test script stores a series of commands to be executed by the application program to avoid having an operator enter a series of commands. This approach is used because a computer can execute a test script somewhat faster than an operator manually entering the commands, and can do so unattended, freeing the operator for other tasks. Existing software quality assurance (QA) tools such as Segue's Quality Works/QA Partner and Microsoft's Visual Test support the creation and use of scripts for software testing, thereby considerably reducing the operator time required relative to manual testing.

Computer processing time is far cheaper and exists in much greater surplus than human operator time. Therefore, software testing is effectively limited by the amount of operator intervention required per test. Even with automation, there are a number of steps that must be taken by an operator. Even though creation and execution of tests may be automated, the operator must review the results of the execution, correlate the results from multiple machines, document any errors or defects, debug the application program and/or the test script itself, and/or re-execute the test script. These manual efforts are time consuming and costly.

In large-scale use of such automated testing, most users of these tools find it necessary to manually divide their tests into batches, run the batches in parallel on different machines and then manually combine the results. These operations create a significant additional operator overhead for automated testing. Since there is a fixed overhead per machine, this style of testing discourages making testing faster or more comprehensive by using many machines, because the rapidly increasing overhead quickly causes diminishing returns. Further, this style of testing is poorly suited for tests that are randomly or automatically generated, since the division of tests into batches must be done before each testing session instead of just once, further increasing the overhead.

Thus, there is a need in the art for techniques that increase testing efficiency by solving these problems. The present invention solves these problems using a server computer as a central repository for all tests and results, wherein the server computer is connected to any number of client computers that perform the tests.

SUMMARY OF THE INVENTION

To address the requirements described above, the present invention discloses a method, apparatus, and article of manufacture wherein a server computer acts as a central repository for tests performed by any number of connected client computers, as well as the results of these tests returned by the client computers. A test manager executed by the server computer analyzes the results of the tests performed by the client computers, and determines which tests have passed or failed during execution, whether the tests failed because of an application or other error, and which tests should be re-executed by the same or different client computer. A test grouper analyzes the error messages produced by the application being tested, so that tests that reveal the same defect can be grouped together. A test reducer is iteratively applied to selected tests to reduce the test to the smallest subset of the original test that still reveals the defect.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention improves testing efficiency by using a server computer as a central repository for all tests performed by any number of connected client computers. The server computer also acts a central repository for the results of these tests returned by the client computers. A test manager executed by the server computer analyzes the results of the tests performed by the client computers, and determines which tests have passed or failed during execution, whether the tests failed because of an application or other error, and which tests should be re-executed by the same or different client computer. In this manner, the present invention maximizes the testing efficiency of the resources used and minimizes the amount of time required of the operator to confirm failures. The operator is presented with tests grouped according to their status, i.e., tests that succeeded, tests with errors, tests that may reveal an application program defect but are difficult or impossible to reproduce, and tests that reproducibly cause an application program to fail. For the latter category, the operator has test results for each client computer, so it is immediately apparent whether a defect is universal for the application program or specific to a particular type or configuration of client computer. Further, instead of having to interpret whether individual tests were successful or failed, a test grouper analyzes the error messages produced by the application being tested, so that tests that reveal the same defect can be grouped together. Moreover, a test reducer is iteratively applied to selected tests to reduce the test to the smallest subset of the original test that still reveals the defect.

Hardware Environment

Figure 1:
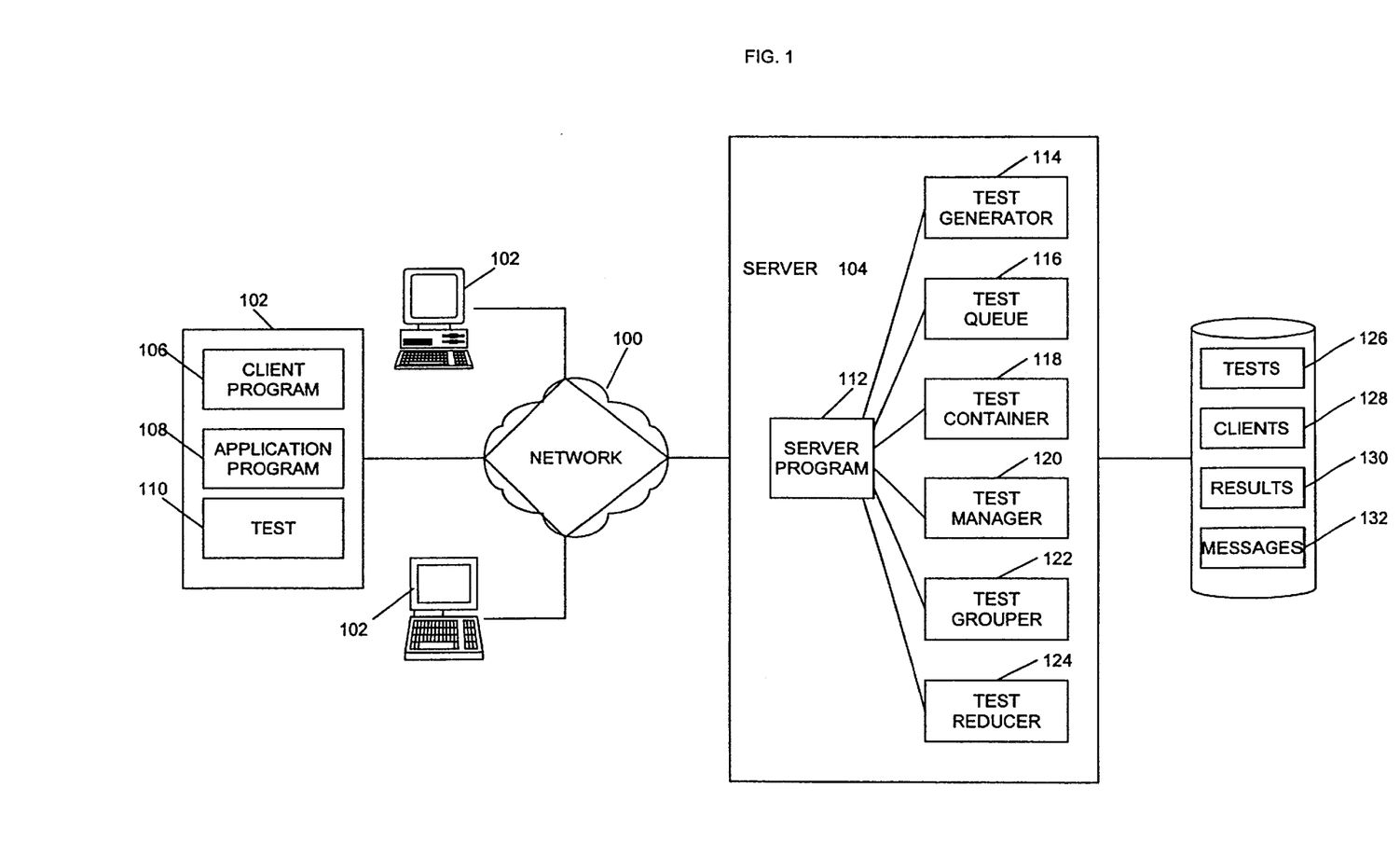
FIG. 1 is an exemplary hardware environment used to implement the preferred embodiment of the invention.

FIG. 1 schematically illustrates an exemplary hardware environment used in the preferred embodiment of the present invention. The present invention is implemented using a network 100 to connect one or more client computers 102 to one or more server computers 104. A typical combination of resources may include client computers 102 that comprise personal computers, network computers, or workstations, and server computers 104 that comprise personal computers, network computers, workstations, minicomputers, or mainframes. The network 100 coupling these computers 102 and 104 may comprise a LAN, WAN, Internet, etc.

Generally, the present invention is implemented using one or more computer programs and databases that are executed and/or interpreted by the server computer 104 and/or the client computers 102. In the exemplary embodiment of FIG. 1, these computer programs and databases include a client program 106, application program 108, and test script 110 executed by the client computers 102; a server program 112, an optional test generator 114, test queue 116, test container 118, test manager 120, test grouper 122, and test reducer 124 executed by the server computer 104; and a test database 126, clients database 128, results database 130, and error messages database 132 stored on or accessible to the server computer 104.

Each of the computer programs and/or databases comprise instructions and data which, when read, interpreted, and executed by their respective computers, cause the computers to perform the steps necessary to execute the steps or elements of the present invention. The computer programs and databases are usually embodied in or readable from a computer-readable device, medium, or carrier, e.g., a local or remote data storage device or memory device coupled to the computer directly or coupled to the computer via a data communications device.

Thus, the present invention may be implemented as a method, apparatus, or article of manufacture using standard programming and/or engineering techniques to produce software, firmware, hardware, or any combination thereof. The term "article of manufacture" (or alternatively, "computer program carrier or product") as used herein is intended to encompass one or more computer programs and/or databases accessible from any device, carrier, or media.

Of course, those skilled in the art will recognize that the exemplary environment illustrated in FIG. 1 is not intended to limit the present invention. Indeed, those skilled in the art will recognize that other alternative hardware environments may be used without departing from the scope of the present invention.

Operation of the Network Distributed Automated Testing System

The present invention initiates operations by executing the client program 106 on the client computers 102 and the server program 112 on the server computer 104. In turn, the client program 106 controls the initiation and operation of the application program 108 on the client computers 102, and the server program 112 controls the initiation and operation of the optional test generator 114, test queue 116, test container 118, test manager 120, test grouper 122, and test reducer 124 on the server computer 104.

When the client program 106 is executed by the client computer 102, it first gathers information about the client computer 102, which may include information about the configuration of the client computer 102, the operating environment of the client computer 102, the application program 108 being tested, the test 110 being performed, etc. The gathered information is packaged in a client message that is sent from the client program 106 to the server program 112 along with a request for a test 110.

Tests 110 retrieved from the test database or generated by the optional test generator 122 are used to fill the test queue 116, which stores any number of tests 110 to be executed on the client computers 102. Each test 110 is encapsulated within an object in the queue 114, wherein the object includes information about the test's current status, execution history, and which client computers 102 should execute the test 110. The queue 114 may be filled with prewritten tests 110 or tests 110 may be generated as needed to keep a minimum number of tests 110 queued at all times.

When the server program 112 receives a request for a test 110 from a client program 106, it selects the first test 110 from its queue 114 that best matches the information received from the client program 106, and then transmits that test 110 to the client program 106. The server program 112 also marks the object representing the test 110 with the current time and moves it to the test container 118, which stores any number of executing tests 110.

The client database 124, which maintains a list of connected client computers 102, is updated when a client program 106 first requests a test 110. This database 124 is used by the test manager 120 to determine which client computers 102 are currently available, and is also used to maintain test 110 statistics on a per client program 108 basis and/or per client computer 102 basis.

After the client program 106 receives the test 110 from the server program 112, it loads the test 110 into an appropriate testing tool, and then executes the test 110. When the test 110 has finished executing, the client program 106 sends the results to the server program 112 and then repeats the process. The client program 106 continues testing in this manner until it is stopped. Since no tests 110 or results are permanently stored on the client computer 102, the only storage overhead on the client computer 104 is the overhead associated with actually executing the client program 106, the application program 108, and the test 110 itself.

If a user-configurable period passes before the results of the test 110 are reported from the client program 106 to the server program 112, a timeout occurs and the test 110 is removed from the container 116 and returned to the queue 114. Moreover, the test 110 is retired if it causes more than one timeout to occur. This provides a level of fault tolerance to deal with any crashes or interruptions of the client computers 102.

When the server program 112 receives results from a client program 106, it encapsulates the results in a results object, which is attached to the appropriate test 110 object in the container 116. The test 110 object is then removed from the container 116 and transferred to the test manager 120 for processing. The results are also stored in the results database 130 on the server computer 104.

Upon receiving the test 110 object and results object, the test manager 120 first determines whether the test 110 passed or failed in its most recent execution. If it passed, the test manager 120 checks to see whether the test 110 has ever failed. If it has never failed, the test 110 is retired from the system.

If the test 110 failed in its most recent execution, the test manager 120 attempts to determine whether the failure was due to a defect in the application program 108 being tested or an error in the test 110 itself. In the latter case, the test 110 is marked as an error and retired.

In the former case, the test manager 120 examines the information concerning the client computer 102 that executed the test 110, and determines if other different client computers 102 are currently connected to the server computer 102 and are available for executing the test 110. If there are such available client computers 102, the test 110 is returned to the queue 114 to await execution by these client computers 102; otherwise, the test 110 is marked as an application program 108 defect and retired from the system.

If a test 110 has failed only once, the test manager 120 checks to see if an "attempting reproduction" flag associated with the test 110 is set. If the flag is set, the test manager 120 marks the test 110 as non-reproducible application program 108 defect and retires it from the system. If the flag is not set, the test manager 120 sets the flag, marks the test 110 for execution only on the client computer 102 where it originally failed and returns the test 110 to the queue 114.

If the test 110 has failed two or more times, the test manager 120 examines the information concerning the history of the client computer 102 that executed the test 110, and determines if other different client computers 102 are currently connected to the server computer 102 and are available for executing the test 110. If there are such available client computers 102, the test 110 is returned to the queue 114 to await execution by these client computers 102; otherwise, the test 110 is marked as an application program 108 defect and retired from the system. This ensures that every test 110 that causes a reproducible application program 108 defect has been executed on every type of available client computer 102.

Instead of having to interpret the results from many tests 110, the operator is presented with groups of tests 110: (1) passing tests 110, (2) tests 110 with errors in them, (3) non-reproducible tests 110 that may reveal an application program 108 defect but are difficult or impossible to reproduce; and (4) tests 110 that reproducibly cause the application program 108 to fail. For the latter category, the operator has test 110 results for each client computer 102, so it is immediately apparent whether a failure is universal for the application program 108 or specific to a particular type or configuration of the client computer 102; no re-execution or further investigation is needed to make this determination. Furthermore, for the tests in this category, the test grouper 122 analyzes the error messages generated by the application program 108 during the execution of the test 110, and compares these messages with the error message database 128 compiled from previously executed tests 110. If there is a match, the test 110 is grouped with matching tests 110, indicating that the tests 110 in this group all appear to detect the same application program 108 defect. If there is no match, a new group is created for the defect, and its error messages are added to the database 128.

In another alternative embodiment, at the option of the operator, a test reducer 124 selects one test 110 from each failure type and attempts to reduce it to a minimum portion thereof necessary to reproduce the failure, so that interpretation and analysis by the operator takes the minimum possible time and effort. The reduced test 110 is re-queued for re-execution by the client computers 102. The results of the re-executed test 110 are again processed, but by the test reducer 124 rather than the test manager 120. This process is repeated until the test reducer 124 is unable to perform further reductions on the test 110.

Finally, in a preferred embodiment, the automated system will take all necessary precautions to ensure fault tolerance. If the server computer 104 is used with a large number of client computers 102, client programs 106, and/or tests 110 over a specified period of time, the results database 130 may hold the results for thousands of computer hours of testing. Further, tests 110 held in the container 116 or queue 114 may be related to important defects and should not be lost. In order to protect this investment, it is desirable that the system be tolerant of hardware and software faults, on the server side as well as the client side. Thus, the client computers 102 and/or server computers 104 may write the irrecoverable aspects of its current state to a data storage device periodically. Using this information, the client computers 102 and/o server computers 104 can be restarted without information loss.

Logic of the Network Distributed Automated Testing System

Flowcharts which illustrate the logic of the network distributed automatic testing system of the present invention are shown in FIGS. 2, 3, 4 and 5. Those skilled in the art will recognize that this logic is provided for illustrative purposes only and that different logic may be used to accomplish the same results.

Client Program

Figure 2:
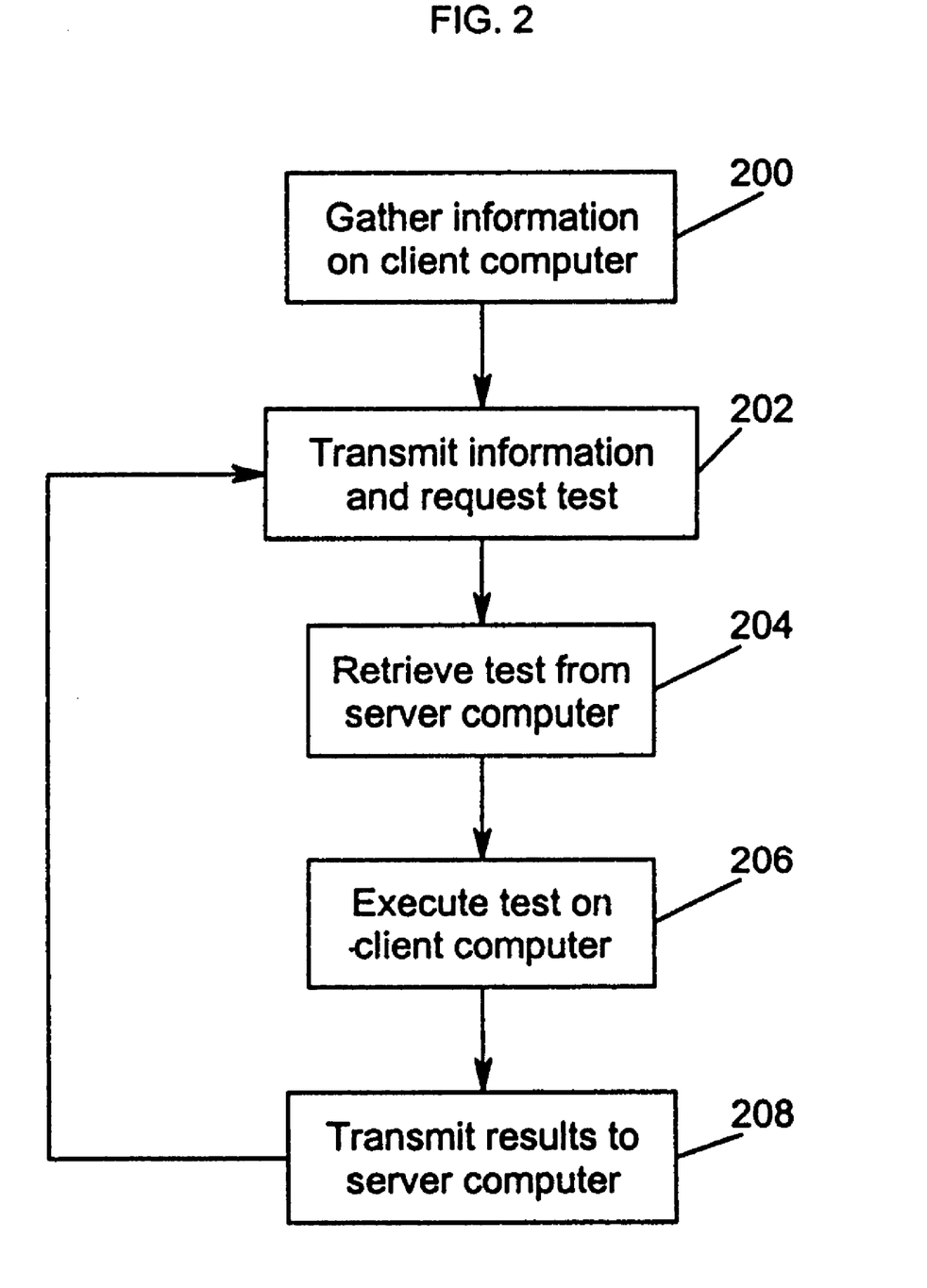
FIG. 2 is a flowchart that illustrates the general logic of a client computer performing the steps of the present invention.

FIG. 2 is a flowchart that illustrates the general logic of the client program 106 when performing the steps of the present invention.

Block 200 represents the client program 106 gathering information on the client computer 102. This information may include, inter alia, information about the operating environment of the client computer 102, the application program 108 being tested, and the test 110 being performed.

Block 202 represents the client program 106 requesting a test 110 from the server program 112. The request includes the gathered information, so that the server program 112 can choose an appropriate test 110.

Block 204 represents the client program 106 receiving the test 110 from the server program 112.

Block 206 represents the client program 106 initiating execution of the test 110 on the client computer 102. Generally, the test 110 is loaded into an appropriate testing tool for execution, although some tests may execute without such tools.

Figure 3:
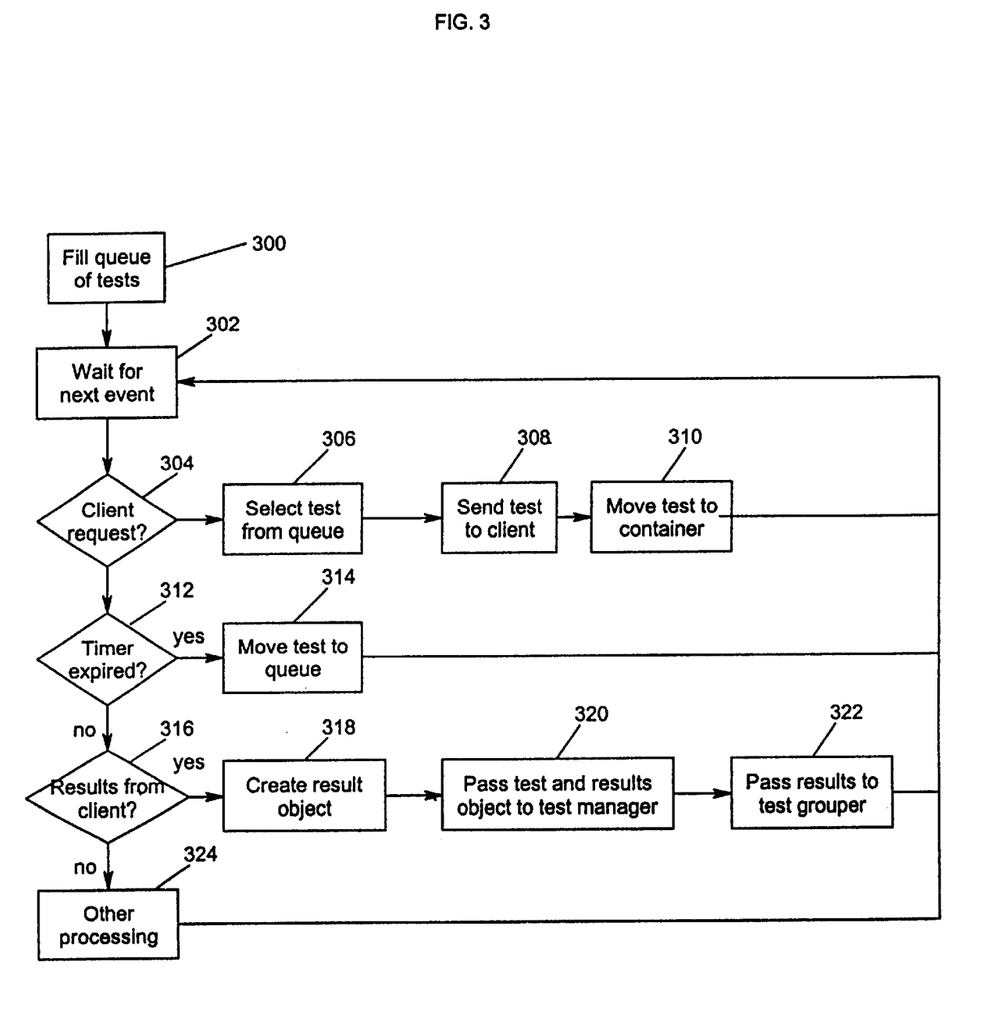
FIG. 3 is a flowchart that illustrates the general logic of a server computer performing the steps of the present invention.

Block 208 represents the client program 108 transmitting the results from the execution of the test 110 to the server program 112, as described in FIG. 3.

Thereafter, control transfers to Block 202.

Server Program

FIG. 3 is a flowchart that illustrates the general logic of the server program 112 when performing the steps of the present invention.

Block 300 represents the server program 112 filling the queue 114 of tests 110 on the server computer 104. The test queue 116 stores any number of tests 114 to be executed on the client computers 102, and each test 110 is encapsulated by an object in the queue 114, wherein the object includes information about the current status of the test 110, the execution history of the test 110, and which client computers 102 should execute the test 110. The server program 112 may fill the queue 114 with prewritten tests 110 or tests 110 may be generated automatically as needed to keep a minimum number of tests 110 queued at all times.

Block 302 represents the server program 112 waiting for the next event to occur. Thereafter, Blocks 304–322 are performed in response to the type of event.

Block 304 is a decision block that represents the server program 112 determining whether the event was the receipt of a request from the client computer 102. If so, control transfers to Block 306; otherwise, control transfers to Block 312.

Block 306 represents the server program 112 selecting a test 110 from the queue 114 for the client computer 102 that best matches the information received from the client program 106. Block 308 represents the server program 112 sending a copy of the selected test 110 to the client program 106. Block 310 represents the server program 112 moving the selected test 110 from the queue 114 to the container 116. Thereafter, control transfers back to Block 302.

Block 312 is a decision block that represents the server program 112 determining whether the event was the expiration of timer for a test 110 in the queue 114, which indicates that a user-configurable period passed without the results of the test 110 being reported from the client program 106 to the server program 112. If so, control transfers to Block 314; otherwise, control transfers to Block 318. Block 314 represents the server program 112 moving the test 110 from the container 116 back to the queue 114. Thereafter, control transfers back to Block 302.

Block 316 is a decision block that represents the server program 112 determining whether the event was the receipt of the test 110 results from the client program 106. If so, control transfers to Block 318; otherwise, control transfers to Block 322. Block 318 represents the server program 112 creating a results object for the test 110 results, and terminating the timer associated with the client program 106. Block 320 represents the server program 112 passing the test 110 and the results object to the test manager 120 for further processing, as described in FIG. 4. Block 322 represents the server program 112 passing the test 110 and the results object to the test grouper 122 for further processing, as described in FIG. 5. Thereafter, control transfers back to Block 302.

Block 324 represents the server program 112 performing other processing tasks. Thereafter, control transfers back to Block 302.

Test Manager

Figure 4:
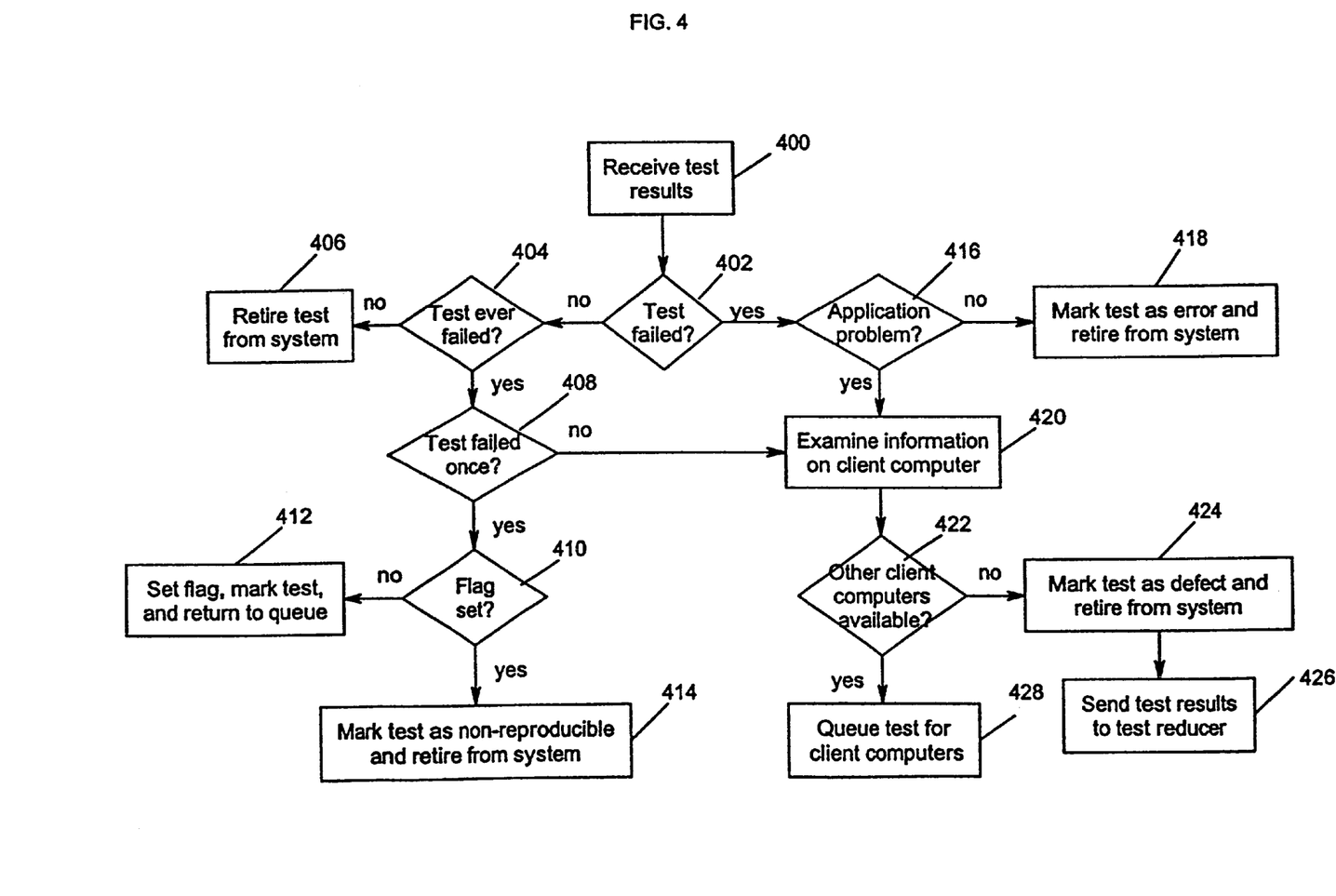
FIG. 4 is a flowchart that illustrates the general logic of a test manager performing the steps of the present invention.

FIG. 4 is a flowchart that illustrates the general logic of the test manager 120 when performing the steps of the present invention.

Block 400 represents the test manager 120 receiving the test 110 and results object from the server program 112.

Block 402 is a decision block that represents the test manager 120 determining whether the test 110 failed. If not, control transfers to Block 404; otherwise, control transfers to Block 416.

Block 404 is a decision block that represents the test manager 120 determining whether the test 110 ever was unsuccessful, i.e., whether it ever failed. If not, control transfers to Block 406; otherwise, control transfers to Block 408.

Block 406 represents the test manager 120 retiring the test 110 from the system.

Block 408 is a decision block that represents the test manager 120 determining whether the test 110 failed just once. If so, control transfers to Block 410; otherwise, control transfers to Block 420.

Block 410 is a decision block that represents the test manager 120 determining whether an "attempting reproduction" flag associated with the test 110 is set. If not, control transfers to Block 412; otherwise, control transfers to Block 414.

Block 412 represents the test manager 120 setting the flag, marking the test 110 for execution only on the client computer 102 where it originally failed, and returning the test 110 to the queue 114.

Block 414 represents the test manager 120 retiring the test 110 from the system as being associated with a non-reproducible application program 108 defect.

Block 416 is a decision block that represents the test manager 120 determining whether the test 110 failed due to an application program 108 defect. If not, control transfers to Block 418; otherwise, control transfers to Block 420.

Block 418 represents the test manager 120 marking the test as an error and retiring the test 110 from the system.

Block 420 represents the test manager 120 examining the information concerning the client computer 102 that executed the test 110.

Block 422 is a decision block the represents the test manager 120 determining whether other different client computers 102 are currently connected to the server computer 102 and are available for executing the test 110. If not, control transfers to Block 424; otherwise, control transfers to Block 428.

Block 424 represents the test manager 120 marking the test 110 as an application program 108 defect and retiring the test 110 from the system.

Figure 6:
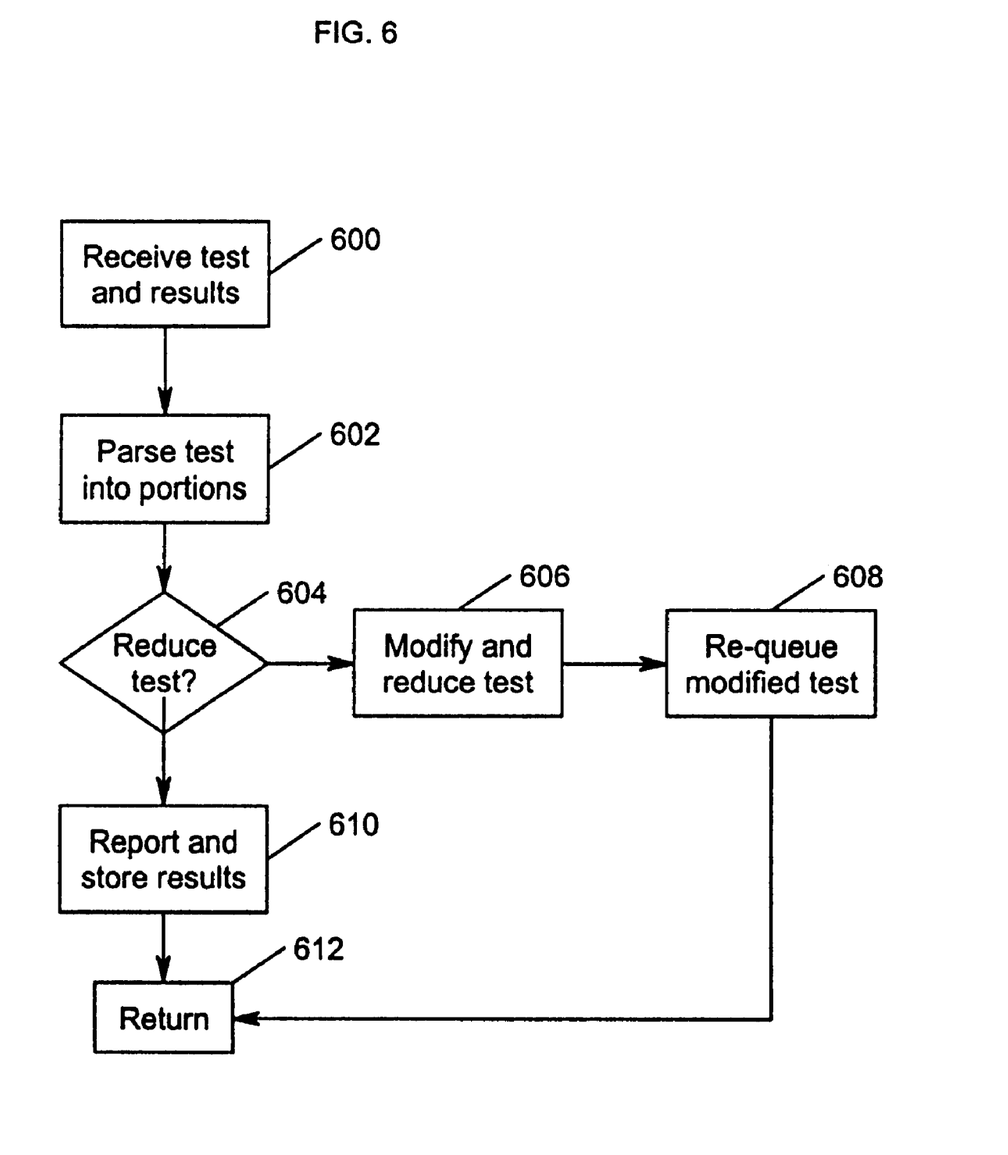
FIG. 6 is a flowchart that illustrates the general logic of a test reducer performing the steps of the present invention.

Block 426 represents the test manager 120 (optionally) invoking the test reducer 124 for further processing of the test 110, as described in FIG. 6.

Block 428 represents the test manager 120 returning the test 110 to the queue 114 for execution by other client computers 102.

Test Grouper

Figure 5:
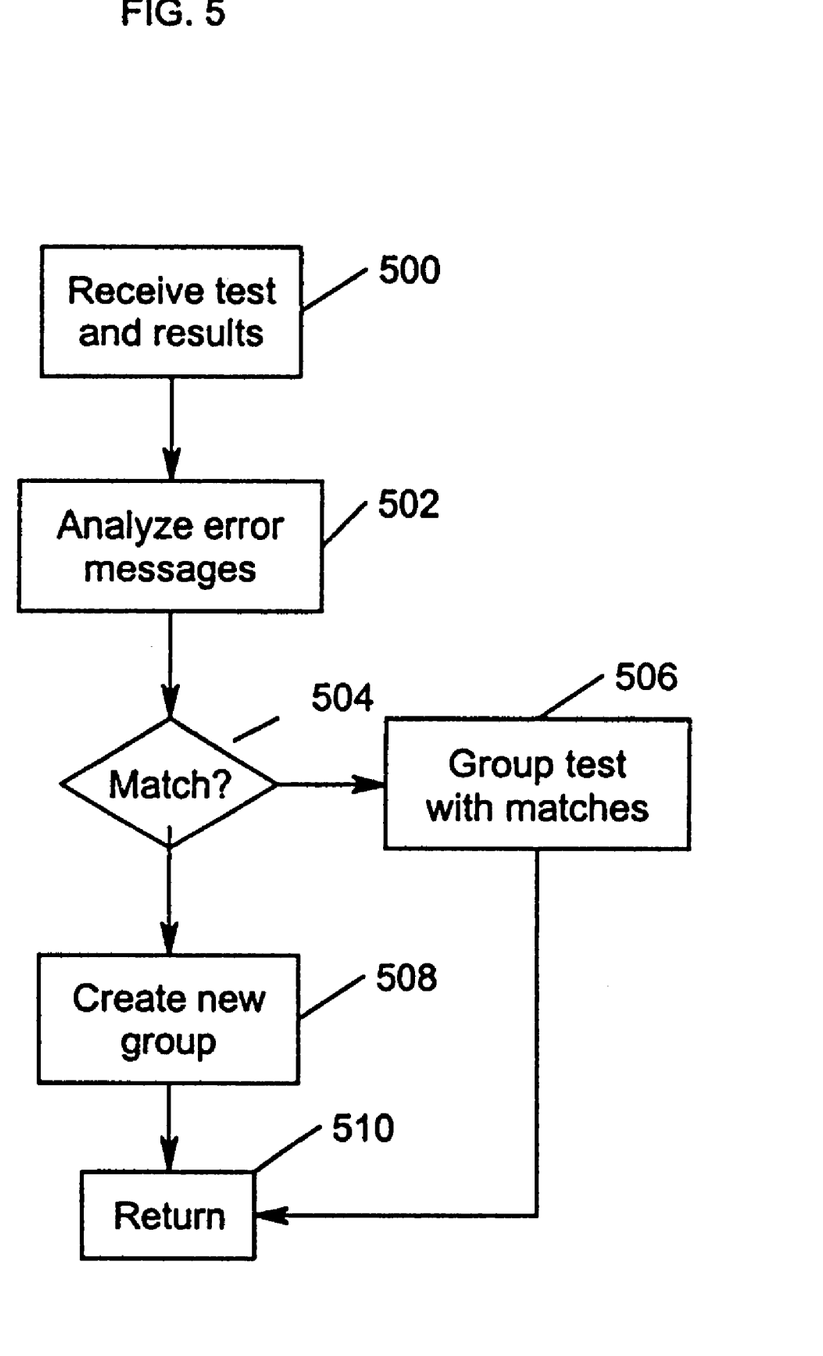
FIG. 5 is a flowchart that illustrates the general logic of a test grouper performing the steps of the present invention.

FIG. 5 is a flowchart that illustrates the general logic of the test grouper 122 when performing the steps of the present invention.

Block 500 represents the test grouper 122 receiving the test 110 and results object from the test manager 120.

Block 502 represents the test grouper 122 analyzing the error messages generated by the application program 108 during the execution of the test 110 and comparing these messages with the error message database 128 compiled from previously executed tests 110.

Block 504 is a decision block that represents the test grouper 122 determining whether there is a match from the comparison. If so, control transfers to Block 506; otherwise, control transfers to Block 508.

Block 506 represents the test grouper 122 grouping the test 110 with matching tests 110, indicating that the tests 110 in this group all appear to detect the same application program 108 defect.

Block 508 represents the test grouper 122 creating a new group for the defect, and adding its error messages to the database 128.

Block 510 represents the end of the logic.

Test Reducer

FIG. 6 is a flowchart that illustrates the general logic of the test reducer 124 when performing the steps of the present invention.

Block 600 represents the test reducer 124 receiving the test 110 and results object from the test manager 120, after the test 110 has been identified as causing an application program 108 defect.

Block 602 is a decision block that represents the test reducer 124 parsing the test 110 into its smallest syntactically discrete portions.

Block 604 is a decision block that represents the test reducer 124 analyzing the results object, state variables and/or the list of test 110 portions to determine whether it is able to reduce the test 110 from its current state. If the test 110 can be reduced, control transfers to Block 606; otherwise, control transfers to Block 610.

Block 606 represents the test reducer 124 modifying (reducing) the test 110. At this step, any number of techniques may be used in reducing a test 110, including, but not limited to one or more of the following:

(a) eliminate all portions of the test 110 following the portion in which the application program 108 defect was detected;

(b) determine if the defect can be detected using (in order) the last portion, the last two portions, etc., before the portion which detects the defect; and (c) eliminate one or more randomly selected portions; if re-execution still detects the application program 108 defect; otherwise replace the removed portions and eliminate a new or complementary set of portions. The number of portions eliminated in each iteration may be scaled according to the number of portions remaining in the test 110 and the success/failure ratio of recent reduction attempts.

Block 608 represents the test reducer 124 re-queuing the reduced test 110 for re-execution by a client computer 102.

Block 610 represents the test reducer 124 indicating that it is unable to perform further reduction, and saving its results in the results database 130.

Block 612 represents the end of the logic.

Conclusion

This concludes the description of the preferred embodiment of the invention. The following describes some alternative embodiments for accomplishing the present invention.

For example, any type of computer, such as a mainframe, minicomputer, work station or personal computer, or network could be used with the present invention. In addition, any software program, application or operating system could benefit from the present invention.

In summary, the present invention discloses a method, apparatus, and article of manufacture wherein a server computer acts as a central repository for tests performed by any number of connected client computers, as well the results of these tests returned by the client computers. A test manager executed by the server computer analyzes the results of the tests performed by the client computers, and determines which tests have passed or failed during execution, whether the tests failed because of an application or other error, and which tests should be re-executed by the same or different client computer. A test grouper analyzes the error messages produced by the application being tested, so that tests that reveal the same defect can be grouped together. A test reducer is iteratively applied to selected tests to reduce the test to the smallest subset of the original test that still reveals the defect.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An application program testing apparatus, comprising:
    (a) one or more server computers providing a repository for one or more tests and results therefrom; and
    (b) one or more client computers, connected to the server computers, for retrieving the tests from the repository, for executing the tests in conjunction with one or more application programs executed by the client computers, and for storing the results from the executed tests in the repository;
    wherein each of the server computers includes a test manager for analyzing the results of the tests performed by the client computers and for determining which of the tests have passed and which of the tests have failed and for grouping the tests based on the analyzed results.

2. The apparatus of claim 1, wherein each of the client computers includes means for gathering information about the client computer.

3. The apparatus of claim 2, wherein the gathered information is selected from group comprising (1) information concerning an operating environment of the client computer, (2) information concerning the application program being tested, and (3) information concerning the test being performed.

4. The apparatus of claim 2, wherein each of the server computers includes means for selecting a test for the client computer based on the gathered information.

5. The apparatus of claim 1, wherein the each of the server computers includes a test queue for storing any number of tests available for execution on the client computers.

6. The apparatus of claim 5, wherein each test is represented in the queue by an object that includes information about the test's current status, execution history, and which client computers should execute the test.

7. The apparatus of claim 5, wherein a test is selected from the queue in response to a request from the client computer based on a match with information provided by the client computer.

8. The apparatus of claim 1, wherein each of the server computers includes a test container for storing any number of tests being executed on the client computers.

9. The apparatus of claim 1, wherein each of the server computers includes a timer for each test being executed on the client computers.

10. The apparatus of claim 1, wherein the test manager includes means for determining whether the tests failed because of a defect in the application program.

11. The apparatus of claim 1, wherein the test manager includes means for determining whether an error is universal for the application program or specific to a particular type or configuration of client computer.

12. The apparatus of claim 1, wherein the test manager includes means for determining whether the tests should be re-executed by a same or different client computer.

13. The apparatus of claim 1, wherein the test manager groups tests that succeeded, tests with errors, tests that may reveal a defect in an application program but are not reproducible, and tests that reproducibly reveal an application program defect.

14. The apparatus of claim 1, further comprising a test reducer for reducing and re-executing the tests to reveal a portion thereof that reproduces an application program defect.

15. The apparatus of claim 14, wherein the test reducer further comprises means for iteratively reducing and re-executing the tests based on results from previously executed tests.

16. The apparatus of claim 14, wherein the test reducer further comprises means for reducing the tests into syntactically discrete portions.

17. The apparatus of claim 1, further comprising means for ensuring fault tolerance from faults in the client computers.

18. The apparatus of claim 1, further comprising means for ensuring fault tolerance from faults in the server computers.

19. A method for testing application programs, comprising the steps of:
   (a) storing one or more tests and results therefrom in a repository of one or more server computers;
   (b) retrieving the tests from the repository to one or more client computers connected to the server computers, executing the retrieved tests in conjunction with one or more application programs executed by the client computers, and storing the results of the executed tests from the client computers to the repository of the server computers; and
   (c) analyzing the results of the tests performed by the client computers including determining which of the tests have passed and which of the tests have failed based on the results of the tests and grouping the tests based on the results of the tests.

20. The method of claim 19, wherein each of the client computers includes means for gathering information about the client computer.

21. The method of claim 20, wherein the gathered information is selected from group comprising (1) information concerning an operating environment of the client computer, (2) information concerning the application program being tested, and (3) information concerning the test being performed.

22. The method of claim 20, wherein each of the server computers includes means for selecting a test for the client computer based on the gathered information.

23. The method of claim 19, wherein the each of the server computers includes a test queue for storing any number of tests available for execution on the client computers.

24. The method of claim 23, wherein each test is represented in the queue by an object that includes information about the test's current status, execution history, and which client computers should execute the test.

25. The method of claim 23, wherein a test is selected from the queue in response to a request from the client computer based on a match with information provided by the client computer.

26. The method of claim 19, wherein each of the server computers includes a test container for storing any number of tests being executed on the client computers.

27. The method of claim 19, wherein each of the server computers includes a timer for each test being executed on the client computers.

28. The method of claim 19, wherein the step of analyzing the results further includes determining whether the tests failed because of a defect in the application program.

29. The method of claim 19, wherein the step of analyzing the results further includes determining whether an error is universal for the application program or specific to a particular type or configuration of client computer.

30. The method of claim 19, wherein the step of analyzing the results further includes determining whether the tests should be re-executed by a same or different client computer.

31. The method of claim 19, wherein grouping the tests comprises grouping tests that succeeded, tests with errors, tests that may reveal a defect in an application program but are not reproducible, and tests that reproducibly reveal an application program defect.

32. The method of claim 19, further comprising the step of:
   (a) storing one or more tests and results therefrom in a repository of one or more server computers;
   (b) retrieving the tests from the repository to one or more client computers connected to the server computers, executing the retrieved tests in conjunction with one or more application programs executed by the client computers, and storing the results of the executed tests from the client computers to the repository of the server computers; and
   (c) reducing and re-executing the tests to reveal a portion thereof that reproduces an application program defect.

33. The method of claim 32, wherein reducing and re-executing further comprises iteratively reducing and re-executing the tests based on results from previously executed tests.

34. The method of claim 32, wherein reducing further comprises reducing the tests into syntactically discrete portions.

35. The method of claim 19, further comprising the step of ensuring fault tolerance from faults in the client computers.

36. The method of claim 19, further comprising the step of ensuring fault tolerance from faults in the server computers.

37. An article of manufacture comprising a computer program carrier readable by a computer and embodying one or more instructions executable by the computer to perform method steps for testing application programs, the method comprising the steps of:
   (a) storing one or more tests and results therefrom in a repository of one or more server computers;
   (b) retrieving the tests from the repository to one or more client computers connected to the server computers, executing the retrieved tests in conjunction with one or more application programs executed by the client computers, and storing the results of the executed tests from the client computers to the repository of the server computers; and
   (c) analyzing the results of the tests performed by the client computers including determining which of the tests have passed and which of the tests have failed based on the results of the tests and grouping the tests based on the results of the tests.

38. The article of manufacture of claim 37, wherein each of the client computers includes means for gathering information about the client computer.

39. The article of manufacture of claim 38, wherein the gathered information is selected from group comprising (1) information concerning an operating environment of the client computer, (2) information concerning the application program being tested, and (3) information concerning the test being performed.

40. The article of manufacture of claim 38, wherein each of the server computers includes means for selecting a test for the client computer based on the gathered information.

41. The article of manufacture of claim 37, wherein the each of the server computers includes a test queue for storing any number of tests available for execution on the client computers.

42. The article of manufacture of claim 41, wherein each test is represented in the queue by an object that includes information about the test's current status, execution history, and which client computers should execute the test.

43. The article of manufacture of claim 41, wherein a test is selected from the queue in response to a request from the client computer based on a match with information provided by the client computer.

44. The article of manufacture of claim 37, wherein each of the server computers includes a test container for storing any number of tests being executed on the client computers.

45. The article of manufacture of claim 37, wherein each of the server computers includes a timer for each test being executed on the client computers.

46. The article of manufacture of claim 37, wherein the step of analyzing the results further includes determining whether the tests failed because of a defect in the application program.

47. The article of manufacture of claim 37, wherein the step of analyzing the results further includes determining whether an error is universal for the application program or specific to a particular type or configuration of client computer.

48. The article of manufacture of claim 37, wherein the step of analyzing the results further includes determining whether the tests should be re-executed by a same or different client computer.

49. The article of manufacture of claim 37, wherein grouping the tests comprises grouping tests that succeeded, tests with errors, tests that may reveal a defect in an application program but are not reproducible, and tests that reproducibly reveal an application program defect.

50. The article of manufacture of claim 37, wherein the method further comprises reducing and re-executing the tests to reveal a portion thereof that reproduces an application program defect.

51. The article of manufacture of claim 50, wherein reducing and re-executing further comprises iteratively reducing and re-executing the tests based on results from previously executed tests.

52. The article of manufacture of claim 50, wherein reducing further comprises reducing the tests into syntactically discrete portions.

53. The method of claim 37, further comprising the step of ensuring fault tolerance from faults in the client computers.

54. The method of claim 37, further comprising the step of ensuring fault tolerance from faults in the server computers.

55. An application program testing apparatus, comprising:
   (a) one or more server computers providing a repository for one or more tests and results therefrom;
   (b) one or more client computers, connected to the server computers, for retrieving the tests from the repository, for executing the tests in conjunction with one or more application programs executed by the client computers, and for storing the results from the executed tests in the repository; and
   (c) a test reducer for reducing and re-executing the tests to reveal a portion thereof that reproduces an application program defect;
   wherein the test reducer further comprises means for reducing the tests according to one or more of the following techniques:
      (a) eliminate all portions of the test following the portion in which the application program defect was detected;
      (b) determine if the defect can be detected using (in order) the last portion, the last two portions, etc., before the portion which detects the defect; and
      (c) eliminate one or more randomly selected portions; if re-execution still detects the application program defect; otherwise replace the removed portions and eliminate a new or complementary set of portions.

56. A method for testing application programs, comprising the steps of:
   (a) storing one or more tests and results therefrom in a repository of one or more server computers;
   (b) retrieving the tests from the repository to one or more client computers connected to the server computers, executing the retrieved tests in conjunction with one or more application programs executed by the client computers, and storing the results of the executed tests from the client computers to the repository of the server computers; and
   (c) reducing and re-executing the tests to reveal a portion thereof that reproduces an application program defect;
   wherein reducing further comprises reducing the tests according to one or more of the following techniques:
      (a) eliminating all portions of the test following the portion in which the application program defect was detected;
      (b) determine if the defect can be detected using (in order) the last portion, the last two portions, etc., before the portion which detects the defect; and
      (c) eliminate one or more randomly selected portions; if re-execution still detects the application program defect; otherwise replace the removed portions and eliminate a new or complementary set of portions.

57. An article of manufacture comprising a computer program carrier readable by a computer and embodying one or mote instructions executable by the computer to perform method steps for testing application programs, the method comprising the steps of:
   (a) storing one or more tests and results therefrom in a repository of one or more server computers;
   (b) retrieving the tests from the repository to one or more client computers connected to the server computers, executing the retrieved tests in conjunction with one or mote application programs executed by the client computers, and storing the results of the executed tests from the client computers to the repository of the server computers; and
   (c) reducing and re-executing the tests to reveal a portion thereof that reproduces an application program defect;
   wherein reducing further comprises reducing the tests according to one or more of the following techniques:
      (a) eliminating all portions of the test following the portion in which the application program defect was detected;
      (b) determining if the defect can be detected using (in order) the last portion, the last two portions, etc., before the portion which detects the defect; and
      (c) eliminating one or more randomly selected portions; if re-execution still detects the application program defect; otherwise replace the removed portions and eliminate a new or complementary set of portions.

58. An application program testing apparatus, comprising:
(a) one or more server computers providing a repository for one or more tests and results therefrom; and
(b) one or more client computers, connected to the server computers, for retrieving the tests from the repository, for executing the tests in conjunction with one or more application programs executed by the client computers, and for storing the results from the executed tests in the repository;
wherein the test grouper further comprises means for analyzing error messages generated by the application program during the execution of the test, for comparing the analyzed error messages with an error message database compiled from previously executed tests, and for grouping the tests based on the comparison.

59. An article of manufacture comprising a computer program carrier readable by a computer and embodying one or more instructions executable by the computer to perform method steps for testing application programs, the method comprising the steps of:
(a) providing a repository for one or more tests and results therefrom; and
(b) retrieving the tests from the repository by one or more client computers which execute the tests in conjunction with one or more application programs executed by the client computers, and store the results from the executed tests in the repository;
(c) analyzing error messages generated by the application program during the execution of the test including comparing the analyzed error messages with an error message database compiled from previously executed tests and grouping the tests based on the comparison.

60. A method for testing application programs, comprising the steps of:
(a) providing a repository for one or more tests and results therefrom; and
(b) retrieving the tests from the repository by one or more client computers which execute the tests in conjunction with one or more application programs executed by the client computers, and store the results from the executed tests in the repository;
(c) analyzing error messages generated by the application program during the execution of the test including comparing the analyzed error messages with an error message database compiled from previously executed tests and grouping the tests based on the comparison.

* * * * *